(12) United States Patent
Harp et al.

(10) Patent No.: US 9,191,724 B2
(45) Date of Patent: *Nov. 17, 2015

(54) MULTIMEDIA CONTENT DISTRIBUTION MANAGEMENT (71) Applicant: AT&T INTELLECTUAL PROPERTY I, L.P., Atlanta, GA (US)

(72) Inventors: David Harp, Plano, TX (US); Benjamin Jahner, Sweetwater, TN (US); Sean Ohara, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,604

(22) Filed: Feb. 5, 2014

(65) Prior Publication Data

US 2014/0157340 A1 Jun. 5, 2014

Related U.S. Application Data

(63) Continuation of application No. 12/579,110, filed on Oct. 14, 2009, now Pat. No. 8,683,509.

(51) Int. Cl.
*H04N 21/438* (2011.01)
*H04N 21/6379* (2011.01)
*H04N 21/436* (2011.01)
*H04N 21/4363* (2011.01)
*H04N 21/2383* (2011.01)

(52) U.S. Cl.
CPC ....... *H04N 21/6379* (2013.01); *H04N 21/2383* (2013.01); *H04N 21/4363* (2013.01); *H04N 21/4382* (2013.01); *H04N 21/43615* (2013.01); *H04B 2203/545* (2013.01); *H04B 2203/5458* (2013.01)

(58) Field of Classification Search
None
See application file for complete search history.

(56) References Cited

U.S. PATENT DOCUMENTS

| 5,554,968 | A | 9/1996 | Lee |
| 5,621,793 | A | 4/1997 | Bednarek et al. |
| 6,249,223 | B1 | 6/2001 | Christensen |
| 6,809,775 | B2 | 10/2004 | Yule |
| 7,299,503 | B2 * | 11/2007 | Ballard ........................... 726/29 |
| 2007/0291669 | A1 * | 12/2007 | Perkinson .................... 370/310 |
| 2008/0313689 | A1 | 12/2008 | Suzuki et al. |
| 2010/0058052 | A1 * | 3/2010 | Bartels et al. ................. 713/153 |
| 2010/0325652 | A1 * | 12/2010 | Lee et al. ........................ 725/28 |
| 2011/0088074 | A1 | 4/2011 | Harp et al. |
| 2011/0219419 | A1 | 9/2011 | Reisman |

\* cited by examiner

*Primary Examiner* — Nathan Flynn
*Assistant Examiner* — Omar S Parra
(74) *Attorney, Agent, or Firm* — Toler Law Group, PC (57) ABSTRACT

A method includes receiving, at a communications gateway associated with a customer premises, multimedia content from a communications network. The method includes superimposing, via the communications gateway, a heartbeat signal on an alternating current electrical power signal associated with an electrical wiring system of the customer premises. The method includes encoding the multimedia content based on the heartbeat signal to produce encoded multimedia content at the communications gateway. The method also includes wirelessly transmitting the encoded multimedia content from the communications gateway to a device.

20 Claims, 7 Drawing Sheets

MULTIMEDIA CONTENT DISTRIBUTION MANAGEMENT

CLAIM OF PRIORITY

The present application claims priority from, and is a continuation of, U.S. patent application Ser. No. 12/579,110, filed Oct. 14, 2009, the content of which is incorporated by reference herein in its entirety.

FIELD OF THE DISCLOSURE

The present disclosure is generally related to multimedia content distribution management.

BACKGROUND

A residential gateway may be capable of wireless transmission of subscription content from a service provider to devices located external to a subscriber location (e.g. devices outside of a subscriber residence) potentially allowing unauthorized devices to wirelessly receive the subscription content. For example, subscription television content that is wirelessly transmitted from the residential gateway may be received by a set-top box device at the subscriber location and at set-top boxes at nearby locations that are within the wireless transmission range of the residential gateway. Sharing subscription television content with locations other than the subscriber location may violate terms of service agreements and may constitute theft of services. Determining whether a particular set-top box device is located at the subscriber location or at a nearby location may be difficult. As such, it may be difficult to prevent use of subscription television content by unauthorized devices.

DETAILED DESCRIPTION OF THE DRAWINGS

In a particular embodiment, a method of managing distribution of multimedia content is disclosed. The method includes receiving multimedia content from a communications network at a communications gateway associated with a customer premises. The communications gateway encodes the multimedia content based on a heartbeat signal that is superimposed on an alternating current (AC) electrical power signal associated with an electrical wiring system of the customer premises. The communications gateway wirelessly transmits the encoded multimedia content to a communications device.

In another particular embodiment, a communications gateway manages distribution of multimedia content. The communications gateway includes a network interface, an encoding component, and a wireless interface. The network interface is configured to receive multimedia content from a communications network. The encoding component is configured to encode the multimedia content received from the communications network based on a heartbeat signal that is superimposed on an AC electrical power signal associated with an electrical wiring system of a customer premises. The wireless interface is configured to wirelessly transmit the encoded multimedia content to a communications device. An example of a communications device is a customer premises equipment (CPE) device, such as a set-top box device coupled to a display.

In another particular embodiment, a set-top box device is disclosed that includes a wireless interface, an electrical interface, and a decoding component. The wireless interface is configured to wirelessly transmit a request for multimedia content to a communications gateway and to receive encoded multimedia content that is wirelessly transmitted from the communications gateway. The electrical interface is configured to receive an AC electrical power signal via an electrical wiring system. The decoding component is operable to decode the encoded multimedia content based on a heartbeat signal when the heartbeat signal is superimposed on the AC electrical power signal received at the electrical interface.

Figure 1:
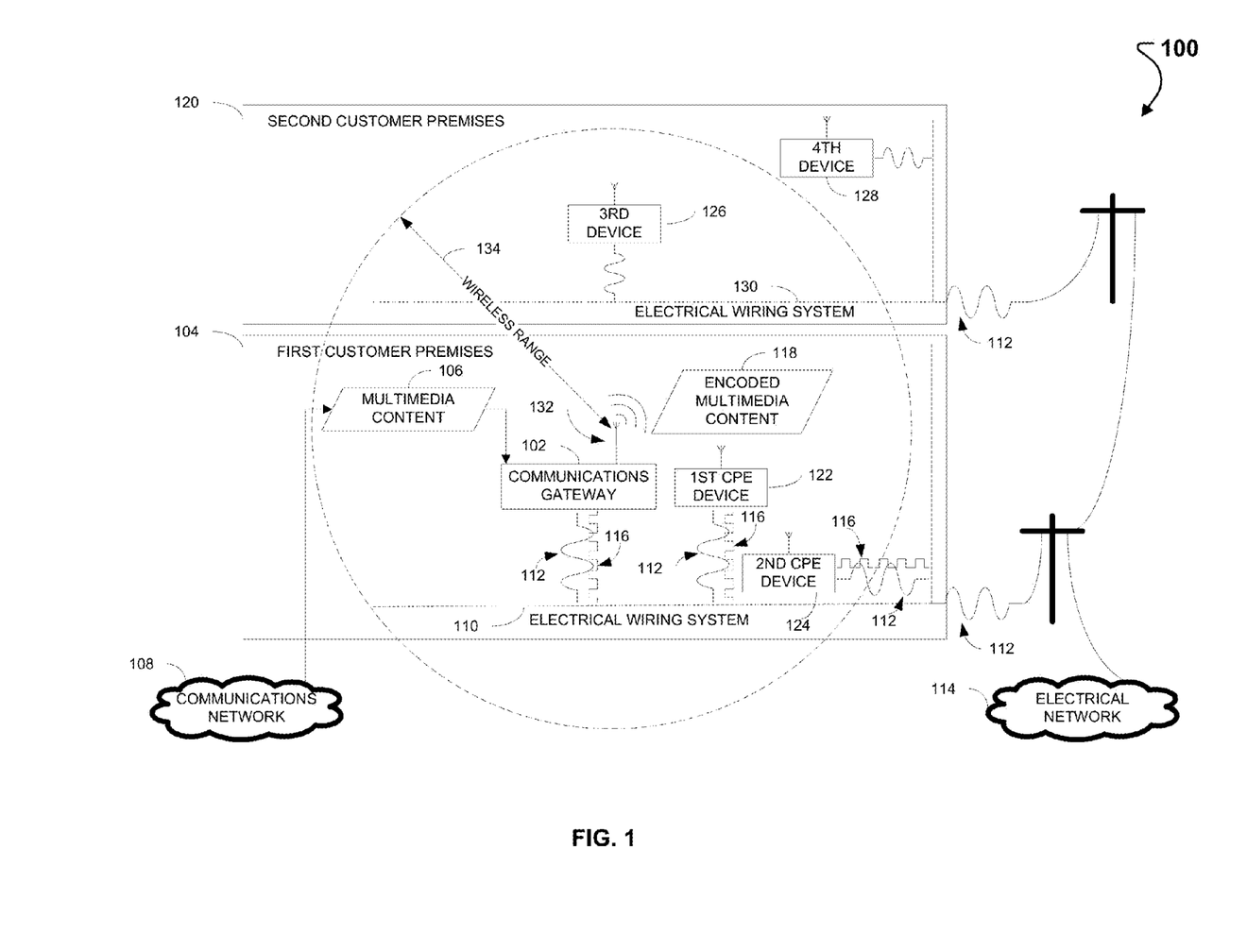
FIG. 1 is a block diagram of a first particular illustrative embodiment of a system of managing distribution of multimedia content.

Referring to FIG. 1, a first illustrative embodiment of a system of managing multimedia content is illustrated, at 100. The system 100 includes a communications gateway 102 associated with a first customer premises 104. The communications gateway 102 receives multimedia content 106 from a communications network 108. The communications gateway 102 is powered via an electrical wiring system 110 of the first customer premises 104. An alternating current (AC) electrical power signal 112 is received at the first customer premises 104 via an electrical network 114 (e.g., an electrical grid). A heartbeat signal 116 is superimposed on the AC electrical power signal 112 within the first customer premises 104. The heartbeat signal 116 may be used by the communications gateway 102 to generate encoded multimedia content 118 prior to wireless transmission. The heartbeat signal 116 may prevent the encoded multimedia content 118 from being decoded at a device of another customer premises (e.g., a device at a second customer premises 120).

In the embodiment illustrated in FIG. 1, a first customer premises equipment (CPE) device 122 and a second CPE device 124 are located at the first customer premises 104. In one embodiment, the first CPE device 122 and the second CPE device 124 are set-top box devices. In alternative embodiments, any number of CPE devices (including devices other than set-top box devices) may be located at the first customer premises 104. The first CPE device 122 and the second CPE device 124 are powered via the electrical wiring system 110 of the first customer premises 104. Thus, the first CPE device 122 and the second CPE device 124 receive the AC electrical power signal 112 and the heartbeat signal 116 that is superimposed on the AC electrical power signal 112.

In the embodiment illustrated in FIG. 1, a third device 126 and a fourth device 128 are located at the second customer premises 120. The third device 126 and the fourth device 128 are powered via an electrical wiring system 130 of the second customer premises 120. Thus, the third device 126 and the fourth device 124 receive the AC electrical power signal 112 from the electrical network 114 without the superimposed heartbeat signal 116.

In operation, the communications gateway 102 receives the multimedia content 106 from the communications network 108. The communications network 108 may include an Internet Protocol Television (IPTV) network, a cable television network, or a satellite television network, among other alternatives. The communications gateway 102 encodes the multimedia content 106 based on the heartbeat signal 116 that is superimposed on the AC electrical power signal 112. In the embodiment illustrated, the heartbeat signal 116 may be superimposed on the AC electrical power signal 112 by a powerline beaconing component of the communications gateway 102. Alternatively, a separate powerline beaconing device (see FIG. 2) that is coupled to the electrical wiring system 110 of the first customer premises 104 may be used to superimpose the heartbeat signal 116.

The communications gateway 102 encodes the multimedia content 106 based on the heartbeat signal 116 that is superimposed on the AC electrical power signal 112. For example, the heartbeat signal 116 may be based on a random number. The random number may be used in an encryption algorithm to encode the multimedia content 106. Alternatively, the heartbeat signal 116 may include other information that may be used to encode the multimedia content 106 at the communications gateway 102 and to decode the encoded multimedia content 118 at a CPE device (e.g., the first CPE device 122 or the second CPE device 124).

In one embodiment, the communications gateway 102 wirelessly transmits the encoded multimedia content 118 in response to a request to receive the multimedia content 106. For example, the first CPE device 122 or the second CPE device 124 may transmit a request to receive the multimedia content 106. The request may be received at a wireless transceiver 132 of the communications gateway 102. In response to the request, the communications gateway 102 may transmit the encoded multimedia content 118 via the wireless transceiver 132. Alternatively, the communications gateway 102 may wirelessly transmit the multimedia content 106 without receiving a request from a particular communications device. The wireless transceiver 132 of the communications gateway 102 may be able to transmit the encoded multimedia content 118 over a wireless range 134. The heartbeat signal 116 may be used by a device within the wireless range 134 and connected to the electrical wiring system 110 of the first customer premises 104 to decode the encoded multimedia content 118.

As an example, the first CPE device 122 may transmit a request for the multimedia content 106 to the communications gateway 102. As shown in FIG. 1, the first CPE device 122 is within the wireless range 134 of the communications gateway 102 and is capable of receiving the encoded multimedia content 118 via a wireless transmission from the communications gateway 102. As illustrated in FIG. 1, the first CPE device 122 is coupled to the electrical wiring system 110 of the first customer premises 104. As such, the first CPE device 122 receives the heartbeat signal 116 that is superimposed on the AC electrical power signal 112 received via the electrical wiring system 110. The encoded multimedia content 118 is decodable at the first CPE device 122 using the heartbeat signal 116.

As another example, the second CPE device 124 is within the wireless range 134 of the communications gateway 102 and is coupled to the electrical wiring system 110 of the first customer premises 104. As such, the second CPE device 124 receives the heartbeat signal 116 that is superimposed on the AC electrical power signal 112 received via the electrical wiring system 110. The encoded multimedia content 118 is decodable at the second CPE device 124 using the heartbeat signal 116.

Figure 2:
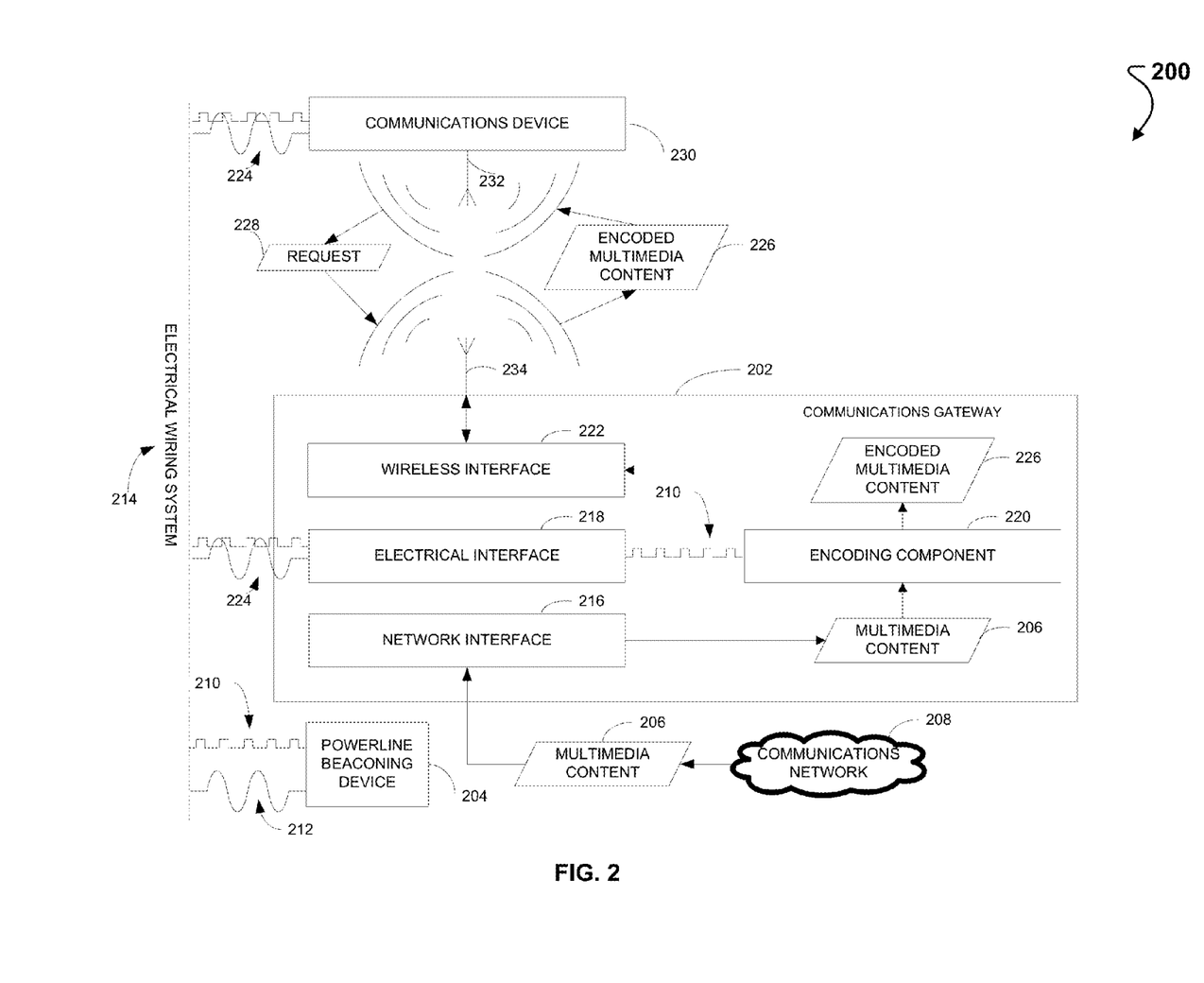
FIG. 2 is a block diagram of a second particular illustrative embodiment of a system of managing distribution of multimedia content.

As illustrated in FIG. 1, the wireless range 134 of the communications gateway 102 may extend beyond the first customer premises 104. For example, in FIG. 2, a portion of the second customer premises 120 is within the wireless range 134 of the communications gateway 102. As illustrated in FIG. 2, the third device 126 is within the wireless range 134 of the communications gateway 102, and the fourth device 128 is outside of the wireless range 134. Thus, the third device 126 is capable of receiving wireless transmissions from the communications gateway 102.

The heartbeat signal 116 may prevent the encoded multimedia content 118 that is wirelessly transmitted from the communications gateway 102 from being decoded at a device of another customer premises (e.g., the third device 126 of the second customer premises 120). The third device 126 is powered via the electrical wiring system 130 of the second customer premises 120. The AC electrical power signal 112 that is received at the first customer premises 104 via the electrical network 114 is also received at the second customer premises 120. However, because the electrical wiring system 130 of the second customer premises 120 is isolated from the electrical wiring system 110 of the first customer premises 104, the heartbeat signal 116 is not superimposed on the AC electrical power signal 112 at the second customer premises 120. Without receiving the heartbeat signal 116, the third device 126 is unable to decode the encoded multimedia content 118 using the heartbeat signal 116.

In a particular embodiment, the heartbeat signal 116 that is superimposed on the AC electrical power signal 112 is periodically modified. For example, the heartbeat signal 116 may be based on a first prime number during a first time interval, and the heartbeat signal 116 may be based on a second prime number during a second time interval. The first time interval may be the same as the second time interval, or the first time interval may be different from the second time interval. For example, the heartbeat signal 116 may be modified at fixed time intervals (e.g., every hour) or may be modified at variable time intervals. Periodically modifying the heartbeat signal 116 may prevent a user at the first customer premises 104 from connecting a device to the electrical wiring system 110 of the first customer premises 104 to obtain the heartbeat signal 116 and subsequently moving the device to the second customer premises 120.

Referring to FIG. 2, a second illustrative embodiment of a system of managing multimedia content is illustrated, at 200. The system 200 includes a communications gateway 202 and a separate powerline beaconing device 204. In a particular embodiment, the communications gateway 202 is the communications gateway 102 of FIG. 1. The communications gateway 202 may encode multimedia content 206 received from a communications network 208 using a heartbeat signal 210 that is superimposed on an AC electrical power signal 212 associated with an electrical wiring system 214 of a customer premises. Encoding the multimedia content 206 may prevent unauthorized use of the multimedia content 206 by devices that are not powered via the same electrical wiring system 214 as the communications gateway 202.

The communications gateway 202 includes a network interface 216, an electrical interface 218, an encoding component 220, and a wireless interface 222. The network interface 216 is configured to receive the multimedia content 206 from the communications network 208. The electrical interface 218 is configured to receive a modified power signal 224 via the electrical wiring system 214 of the customer premises.

The modified power signal 224 received at the electrical interface 218 includes the heartbeat signal 210 superimposed on the AC electrical power signal 212. The encoding component 220 is configured to encode the multimedia content 206 based on the heartbeat signal 210 to generate encoded multimedia content 226. The wireless interface 222 is configured to receive a request 228 from a communications device 230 to receive the multimedia content 206. The wireless interface 222 is further configured to wirelessly transmit the encoded multimedia content 226 to the communications device 230 in response to the request 228. Alternatively, the encoded multimedia content 226 may be wirelessly transmitted without receiving the request 228.

The powerline beaconing device 204 is powered via the electrical wiring system 214. The powerline beaconing device 204 is configured to superimpose the heartbeat signal 210 on the AC electrical power signal 212 to generate the modified power signal 224. The modified power signal 224 is distributed via the electrical wiring system 214. Thus, in the embodiment illustrated in FIG. 2, the heartbeat signal 210 is superimposed by a device (e.g., the powerline beaconing device 204) that is separate from the communications gateway 202. Alternatively, the communications gateway 202 may include a powerline beaconing component that superimposes the heartbeat signal 210.

In operation, the communications gateway 202 receives the multimedia content 206 from the communications network 208 via the network interface 216. The encoding component 220 extracts the heartbeat signal 210 from the modified power signal 224. Based on the extracted heartbeat signal 210, the encoding component 220 generates the encoded multimedia content 226. The wireless interface 222 transmits the encoded multimedia content 226 in response to the request 228 received from the communications device 230. For example, the communications device 230 may transmit the request 228 and receive the encoded multimedia content 226 via a communications device transceiver 232. Similarly, the wireless interface 222 may receive the request 228 and transmit the encoded multimedia content 226 via a communications gateway transceiver 234.

The communications device 230 receives the modified power signal 224 via the electrical wiring system 214. The encoded multimedia content 226 is decodable at the communications device 230 by extracting the heartbeat signal 210 included in the modified power signal 224. Thus, the heartbeat signal 210 may prevent the encoded multimedia content 226 that is wirelessly transmitted from the communications gateway 202 from being decoded by a device that does not receive power via the same wiring system as the communications gateway 202 (e.g., the electrical wiring system 214). This may prevent sharing of subscription multimedia content tied to a single account across multiple living units. Such sharing of subscription content may violate terms of service agreements and may constitute theft of services.

Figure 3:
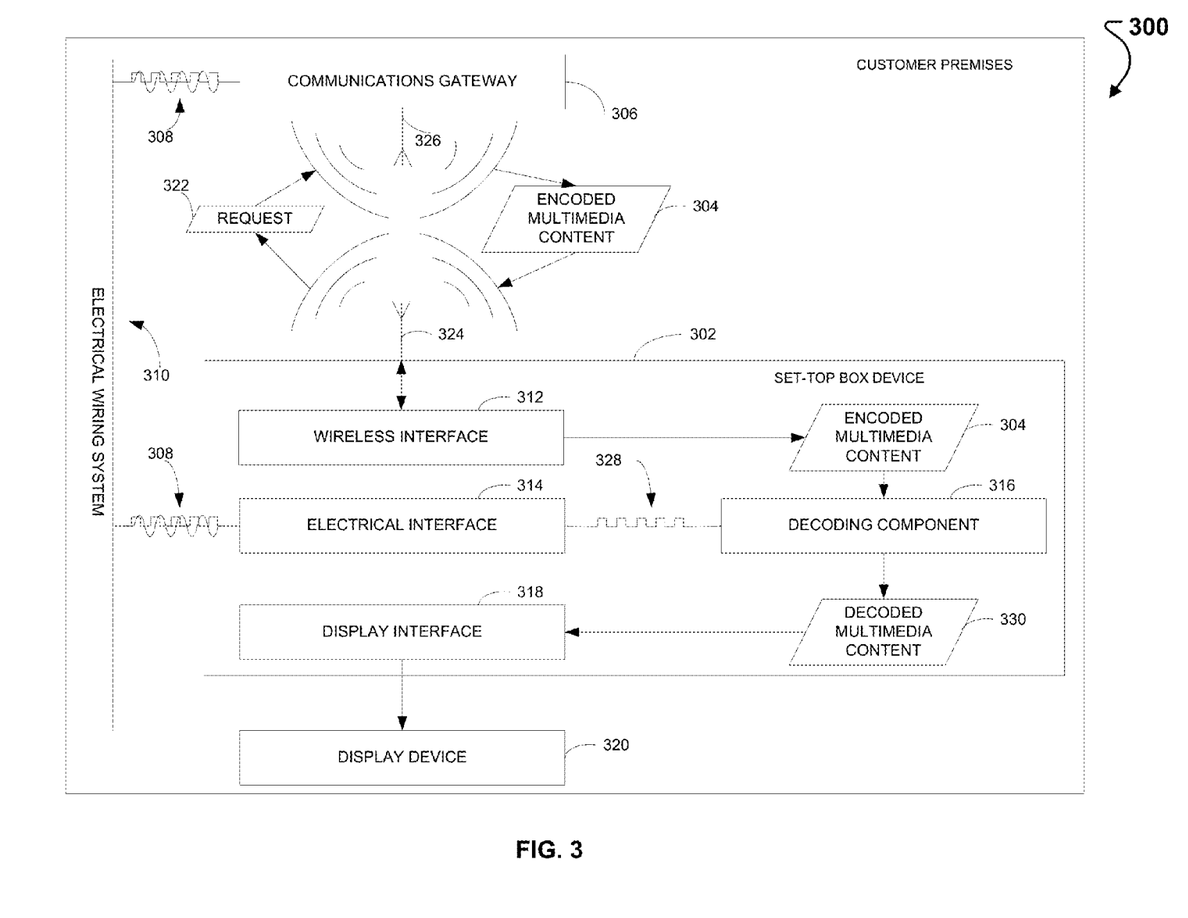
FIG. 3 is a block diagram of a third particular illustrative embodiment of a system of managing distribution of multimedia content.

Referring to FIG. 3, a third illustrative embodiment of a system of managing multimedia content is illustrated, at 300. The system 300 includes a communications device (e.g., a set-top box device) 302. In a particular embodiment, the set-top box device 302 is the communications device 230 of FIG. 2. In another particular embodiment, the set-top box device 302 is the first CPE device 122 of FIG. 1 or the second CPE device 124 of FIG. 1. The set-top box device 302 of FIG. 3 is operable to decode encoded multimedia content 304 that is wirelessly transmitted from a communications gateway 306 using a particular heartbeat signal superimposed on an AC electrical power signal delivered as a modified AC electrical power signal 308 via an electrical wiring system 310. In a particular embodiment, the communications gateway 306 is the communications gateway 202 of FIG. 2 or the communications gateway 102 of FIG. 1. The particular heartbeat signal may be associated with a customer premises of a subscriber and may be used to verify that the set-top box device 302 is located at the customer premises of the subscriber.

The set-top box device 302 includes a wireless interface 312, an electrical interface 314, and a decoding component 316. In the embodiment illustrated in FIG. 3, the set-top box device 302 also includes a display interface 318 that is coupleable to a display device 320. The wireless interface 312 is configured to wirelessly transmit a request 322 to receive multimedia content to the communications gateway 306. The wireless interface 312 is further configured to receive the encoded multimedia content 304 that is wirelessly transmitted from the communications gateway 306. In the embodiment illustrated, the request 322 is transmitted via a set-top box device transceiver 324 to a communications gateway transceiver 326.

The electrical interface 314 is configured to receive the modified AC electrical power signal 308 from the electrical wiring system 310. The decoding component 316 is configured to decode the encoded multimedia content 304 that is wirelessly transmitted from the communications gateway 306 in response to receiving a particular heartbeat signal.

In operation, the set-top box device 302 receives the encoded multimedia content 304 from the communications gateway 306 via the wireless interface 312. The decoding component 316 extracts a heartbeat signal 328 from the modified AC electrical power signal 308 received at the electrical interface 314. When the extracted heartbeat signal 328 matches a particular heartbeat signal, the encoded multimedia content 304 is decodable using the extracted heartbeat signal 328. In this case, the decoding component 316 outputs decoded multimedia content 330. The display interface 318 may receive the decoded multimedia content 330 for display at the display device 320.

When the extracted heartbeat signal 328 does not match a particular heartbeat signal, the encoded multimedia content 304 is not decodable using the extracted heartbeat signal 328. Thus, the set-top box device 302 is operable to decode the encoded multimedia content 304 when the extracted heartbeat signal 328 matches a particular heartbeat signal, indicating that the set-top box device 302 is associated with the same electrical wiring system 310 as the communications gateway 306. This method may prevent the set-top box device 302 from being moved to a location other than the customer premises of the subscriber.

Figure 4:
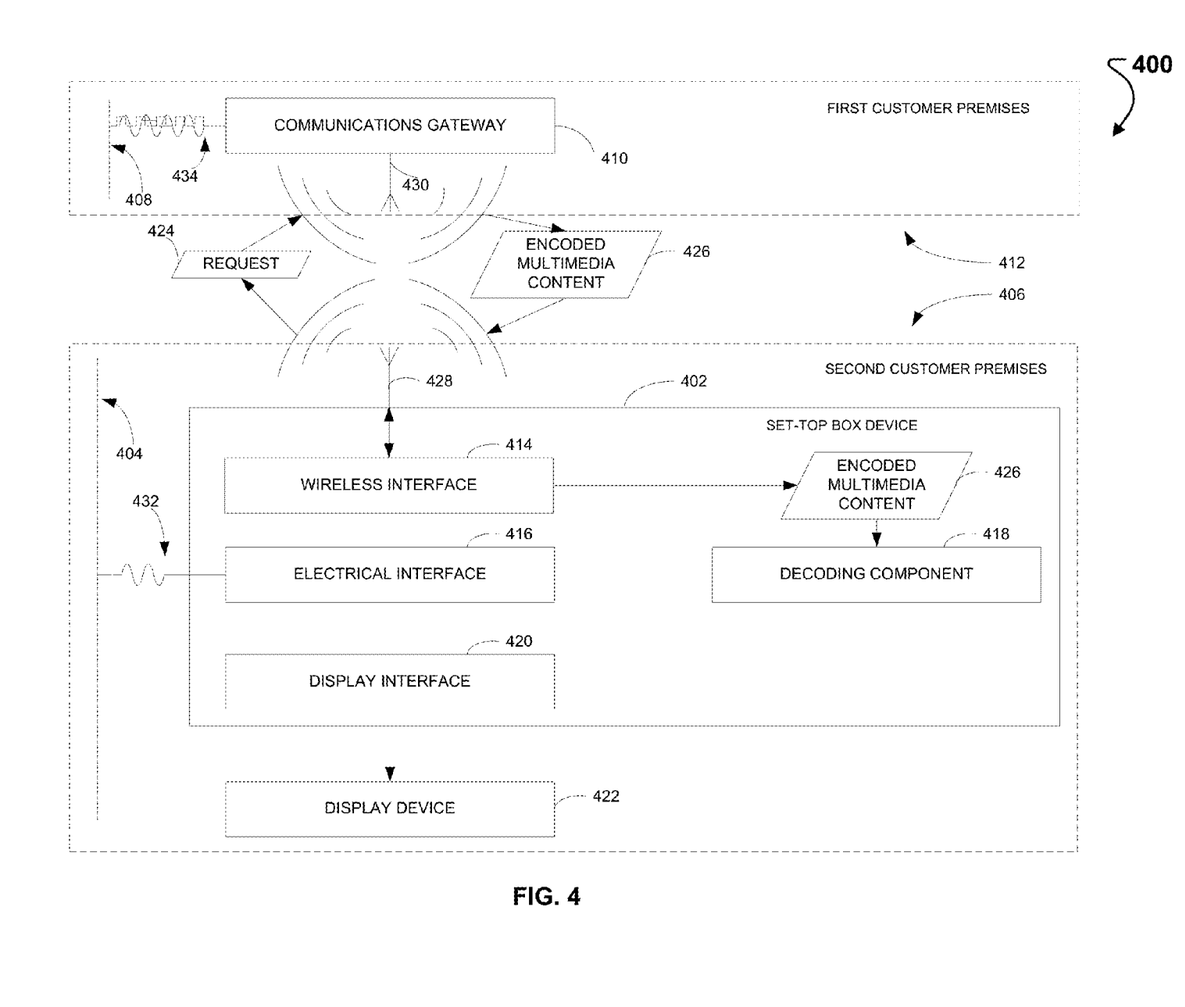
FIG. 4 is a block diagram of a fourth particular illustrative embodiment of a system of managing distribution of multimedia content.

Referring to FIG. 4, a fourth illustrative embodiment of a system of managing multimedia content is illustrated, at 400. The system 400 includes a communications device (e.g., a set-top box device) 402. FIG. 4 illustrates that a device (e.g., the set-top box device 402) that receives power via an electrical system 404 of a second customer premises 406 is prevented from decoding multimedia content without receiving a heartbeat signal associated with a wiring system 408 that powers a communications gateway 410 at a first customer premises 412. In a particular embodiment, the set-top box device 402 is the third device 126 of FIG. 1 located at the second customer premises 120; and the communications gateway 410 is the communications gateway 102 located at the first customer premises 104.

The set-top box device 402 includes a wireless interface 414, an electrical interface 416, and a decoding component 418. In the embodiment illustrated in FIG. 4, the set-top box device 402 also includes a display interface 420 that is coupleable to a display device 422. The wireless interface 414 is configured to wirelessly transmit a request 424 to receive multimedia content to the communications gateway 410. The wireless interface 414 is further configured to receive encoded multimedia content 426 that is wirelessly transmitted from the communications gateway 410. In the embodiment illustrated, the request 424 is transmitted via a set-top box device transceiver 428 to a communications gateway transceiver 430.

The electrical interface 416 is configured to receive an AC electrical power signal 432 from the electrical wiring system 404 of the second customer premises 406. In one embodiment, the AC electrical power signal 432 includes the AC electrical power signal 112 of FIG. 1 (e.g., an un-modified power signal received from the electrical grid). In the embodiment illustrated, the AC electrical power signal 432 received at the electrical interface 416 does not include a superimposed heartbeat signal. By contrast, the communications gateway 410 receives a modified power signal 434 that includes a particular heartbeat signal. The decoding component 418 of the set-top box device 402 is inoperable to decode the encoded multimedia content 426 since the set-top box device 402 does not receive the particular heartbeat signal.

Thus, because the electrical wiring system 404 of the second customer premises 408 is isolated from the electrical wiring system 408 of the first customer premises 412, the particular heartbeat signal associated with the electrical wiring system 408 of the first customer premises 412 is not superimposed on the AC electrical power signal 432 at the second customer premises 408. Without receiving the particular heartbeat signal, the set-top box device 402 is unable to decode the encoded multimedia content 426 using the particular heartbeat signal. As such, the requested multimedia content may not be provided by the display interface 420 to the display device. In one embodiment, the display interface 420 provides an error message or a warning message to the display device 422 as a result. For example, the display device 422 at the second customer premises 406 may display a message indicating that the set-top box device 402 is inoperable because the encoded multimedia content 426 was received from another customer premises (e.g., the first customer premises 412).

Figure 5:
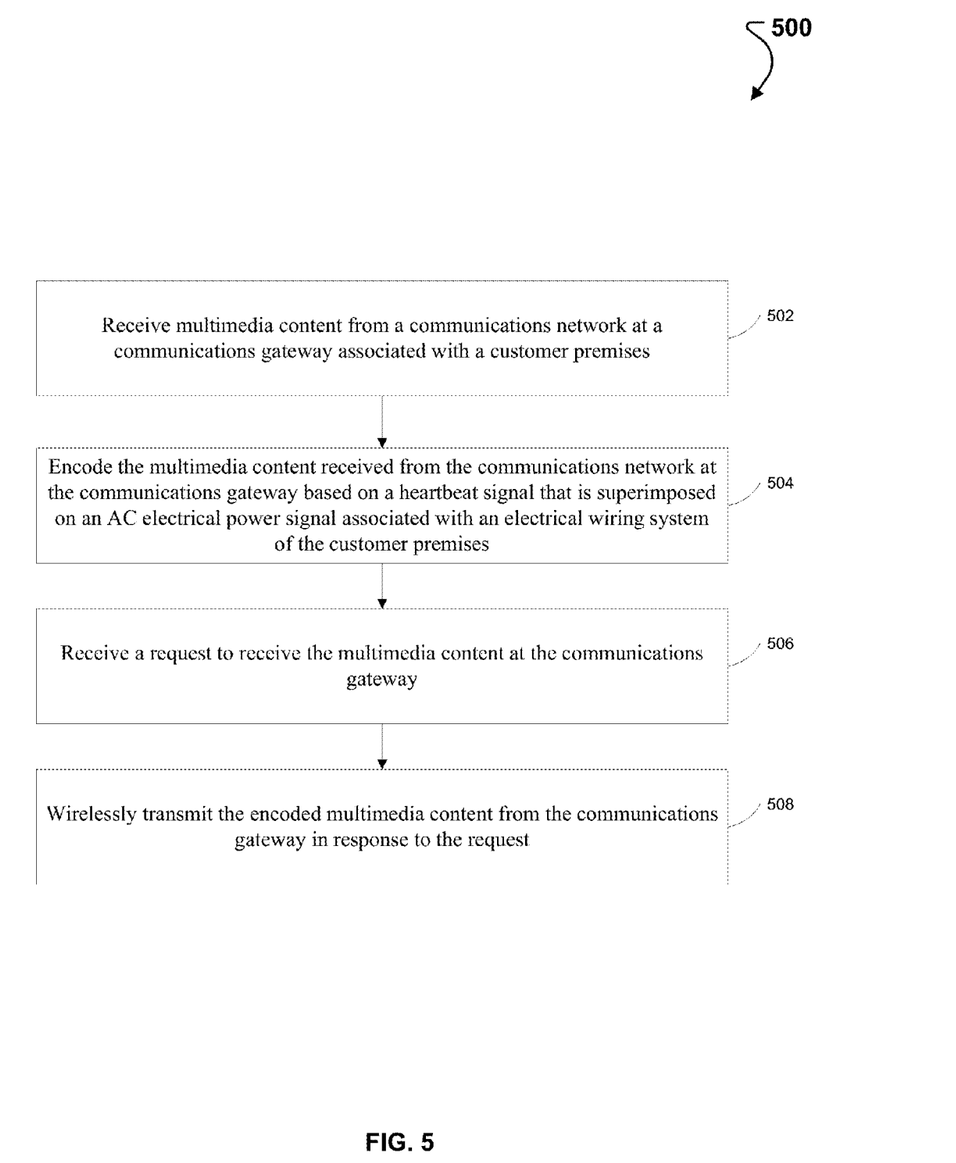
FIG. 5 is a flow chart of a particular illustrative embodiment of a method of managing distribution of multimedia content.

Referring to FIG. 5, a particular illustrative embodiment of a method of managing distribution of multimedia content is illustrated, at 500. The method 500 includes receiving multimedia content from a communications network at a communications gateway associated with a customer premises, at 502. For example, in FIG. 1, the communications gateway 102 receives the multimedia content 106 from the communications network 108.

The method 500 also includes encoding the multimedia content received from the communications network at the communications gateway based on a heartbeat signal that is superimposed on an AC electrical power signal associated with an electrical wiring system of the customer premises, at 504. For example, in FIG. 1, the communications gateway 102 encodes the multimedia content 106 received from the communications network 108 based on a heartbeat signal 116 that is superimposed on an AC electrical power signal 112 associated with an electrical wiring system 110 of the first customer premises 104. As another example, in FIG. 2, the encoding component 220 of the communications gateway 202 encodes the multimedia content 206 received from the communications network 208 based on a heartbeat signal 210 that is superimposed on an AC electrical power signal 212 associated with an electrical wiring system 214.

The method 500 includes receiving a request to receive the multimedia content at the communications gateway, at 506. The method 500 further includes wirelessly transmitting the encoded multimedia content from the communications gateway in response to the request, at 508.

For example, in FIG. 2, the communications gateway 202 receives the request 228 to receive the multimedia content 206 from the communications device 230. The communications gateway 202 wirelessly transmits the encoded multimedia content 226 to the communications device 230 in response to the request 228. Because the communications device 230 receives the heartbeat signal 210 associated with the electrical wiring system 214 that powers the communications gateway 202, the communications device 230 may decode the encoded multimedia content 226 using the heartbeat signal 210.

As another example, in FIG. 3, the communications gateway 306 receives the request 322 from the set-top box device 302. The communications gateway 306 wirelessly transmits the encoded multimedia content 304 to the set-top box device 302 in response to the request 322. Because the set-top box device 302 receives a particular heartbeat signal associated with the electrical wiring system 310 that powers the communications gateway 306, the set-top box device 302 may decode the encoded multimedia content 304 using the particular heartbeat signal.

As a further example, in FIG. 4, the communications gateway 410 at the first customer premises 412 receives the request 424 from the set-top box device 402 at the second customer premises 406. The communications gateway 410 wirelessly transmits the encoded multimedia content 426 to the set-top box device 402 in response to the request 424. The set-top box device 402 receives power via the electrical wiring system 404 associated with the second customer premises 406. Because the set-top box device 402 does not receive a particular heartbeat signal associated with the electrical wiring system 408 of the first customer premises 412 that powers the communications gateway 410, the set-top box device 402 is unable to decode the encoded multimedia content 426 using the particular heartbeat signal.

Figure 6:
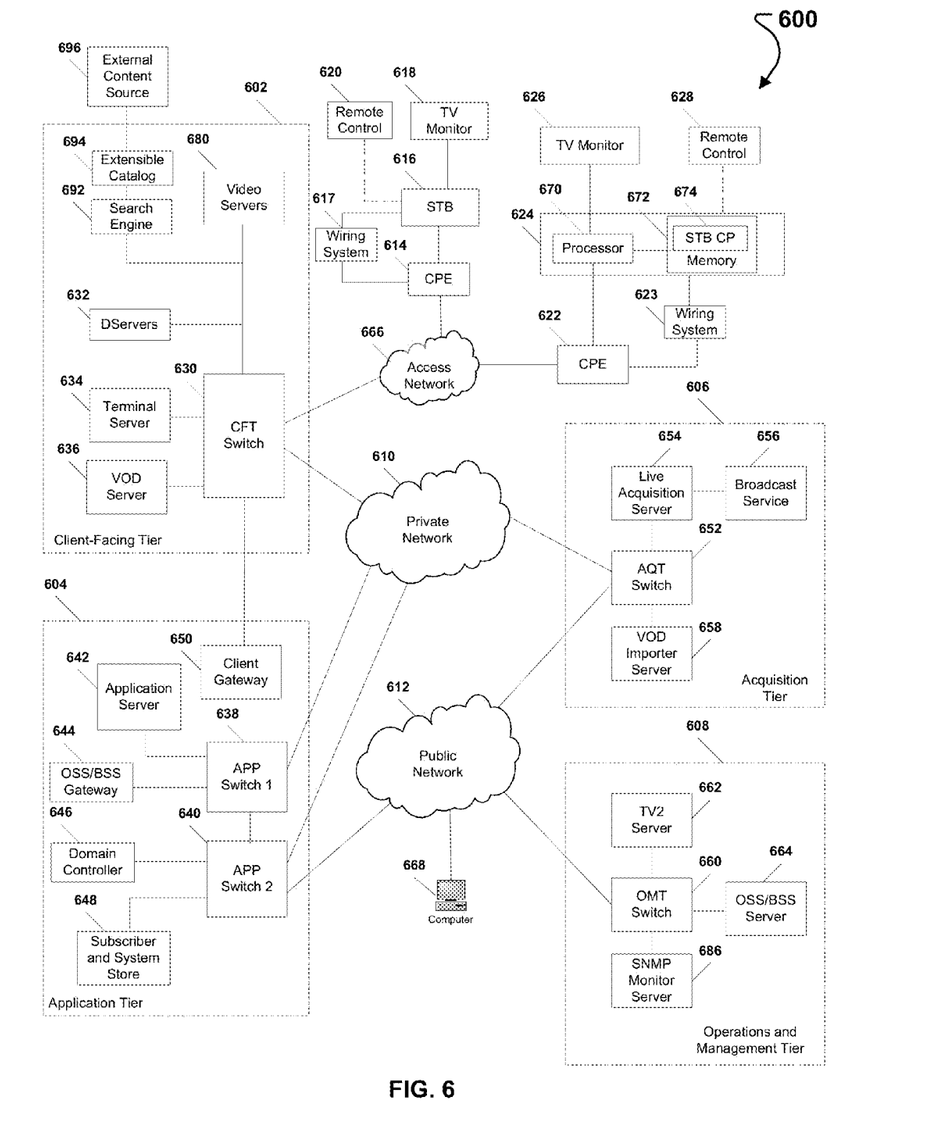
FIG. 6 is a block diagram of an illustrative embodiment of an Internet Protocol Television (IPTV) system to distribute multimedia content.

Referring to FIG. 6, an illustrative embodiment of an Internet Protocol Television (IPTV) system that may be used to share private media content is illustrated and is generally designated 600. For example, the IPTV system 600 may be used to share the multimedia content 106 with the first customer premise 104 of FIG. 1. As shown, the system 600 can include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 can be coupled to the private network 610. Further, the application tier 604 can be coupled to the private network 610 and to the public network 612. The acquisition tier 606 can also be coupled to the private network 610 and to the public network 612. Additionally, the operations and management tier 608 can be coupled to the public network 612.

As illustrated in FIG. 6, the various tiers 602, 604, 606, 608 communicate with each other via the private network 610 and the public network 612. For instance, the client-facing tier 602 can communicate with the application tier 604 and the acquisition tier 606 via the private network 610. The application tier 604 can communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604, including, but not limited to, a client gateway 650, can communicate directly with the client-facing tier 602.

The client-facing tier 602 can communicate with user equipment via an access network 666, such as an Internet Protocol Television (IPTV) access network. For example, the access network 666 may be the communications network 106 of FIG. 1 or the communications network 208 of FIG. 2. In an illustrative embodiment, customer premises equipment (CPE) 614, 622 can be coupled to a local switch, router, or other device of the access network 666. The client-facing tier 602 can communicate with a first representative set-top box device 616 at a first customer premises via the first CPE 614 and with a second representative set-top box device 624 at a second customer premises via the second CPE 622. The CPE 614, 622 can include routers, local area network devices, modems, such as digital subscriber line (DSL) modems, any other suitable devices for facilitating communication between a set-top box device and the access network 666, or any combination thereof. For example, CPE 614, 622 may be a residential gateway, such as the communications gateway 102 of FIG. 1, the communications gateway 202 of FIG. 2, the communications gateway 306 of FIG. 3, or the communications gateway 410 of FIG. 4. As an illustrative example, the first representative set-top box device 616 at the first customer premises may be the first CPE device 122 of FIG. 1 or the second CPE device 124 located at the first customer premises 104, as illustrated in FIG. 1. As another example, the second representative set-top box device 624 at the second customer premises may be the set-top box device 402 located at the second customer premises 406, as illustrated in FIG. 4. As illustrated in FIG. 6, the CPE 614 and the set-top box device 616 at the first customer premise may receive power via a first electrical wiring system 615 associated with the first customer premise. A first modified AC electrical power signal that includes a first superimposed heartbeat signal may be delivered via the first electrical wiring system 615. Similarly, the CPE 622 and the set-top box device 624 at the second customer premise may receive power via a second electrical wiring system 623 associated with the second customer premise. A second modified AC electrical power signal that includes a second superimposed heartbeat signal may be delivered via the second electrical wiring system 623.

In a particular embodiment, the client-facing tier 602 can be coupled to the CPE 614, 622 via fiber optic cables. Alternatively, the CPE 614, 622 can be digital subscriber line (DSL) modems that are coupled to one or more network nodes via twisted pairs, and the client-facing tier 602 can be coupled to the network nodes via fiber-optic cables. Each set-top box device 616, 624 can process data received via the access network 666, via an IPTV software platform, such as Microsoft® TV IPTV Edition.

The first set-top box device 616 can be coupled to a first external display device, such as a first television monitor 618, and the second set-top box device 624 can be coupled to a second external display device, such as a second television monitor 626. Moreover, the first set-top box device 616 can communicate with a first remote control 620, and the second set-top box device 624 can communicate with a second remote control 628. The set-top box devices 616, 624 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 616, 624 can receive data, video, or any combination thereof, from the client-facing tier 602 via the access network 666 and render or display the data, video, or any combination thereof, at the display device 618, 626 to which it is coupled. In an illustrative embodiment, the set-top box devices 616, 624 can include tuners that receive and decode television programming signals or packet streams for transmission to the display devices 618, 626. Further, the set-top box devices 616, 624 can include a STB processor 670 and a STB memory device 672 that is accessible to the STB processor 670. In one embodiment, a computer program, such as the STB computer program 674, can be embedded within the STB memory device 672. In another illustrative embodiment, a user computing device 684, such as a personal computer, laptop or local server, can be coupled to a set-top box device, such as the second representative set-top box device 624, for example, via a universal serial bus (USB) connection or other connection.

In an illustrative embodiment, the client-facing tier 602 can include a client-facing tier (CFT) switch 630 that manages communication between the client-facing tier 602 and the access network 666 and between the client-facing tier 602 and the private network 610. As illustrated, the CFT switch 630 is coupled to one or more data servers, such as D-servers 632, that store, format, encode, replicate, or otherwise manipulate or prepare video content for communication from the client-facing tier 602 to the set-top box devices 616, 624. The CFT switch 630 can also be coupled to a terminal server 634 that provides terminal devices with a connection point to the private network 610. In a particular embodiment, the CFT switch 630 can be coupled to a video-on-demand (VOD) server 636 that stores or provides VOD content imported by the IPTV system 600.

Further, the CFT switch 630 is coupled to one or more video servers 680 that receive video content and transmit the content to the set-top boxes 616, 624 via the access network 666. In a particular embodiment, the CFT switch 630 can be coupled to one or more publication servers 682 that facilitate the formation of groups that share private content and the inclusion of indicators of such private content with video content received by users in a group. The CFT switch 630 is coupled to a search engine 692. The search engine 692 is coupled to an extensible catalog 694. The extensible catalog 694 is coupled to an external content source 696.

In an illustrative embodiment, the client-facing tier 602 can communicate with a large number of set-top boxes, such as the representative set-top boxes 616, 624 over a wide geographic area, such as a regional area, a metropolitan area, a viewing area, a designated market area or any other suitable geographic area, market area, or subscriber or customer group that can be supported by networking the client-facing tier 602 to numerous set-top box devices. In a particular embodiment, the CFT switch 630, or any portion thereof, can include a multicast router or switch that feeds one or more video streams from a video server to multiple set-top box devices.

As illustrated in FIG. 6, the application tier 604 can communicate with both the private network 610 and the public network 612. The application tier 604 can include a first application tier (APP) switch 638 and a second APP switch 640. In a particular embodiment, the first APP switch 638 can be coupled to the second APP switch 640. The first APP switch 638 can be coupled to an application server 642 and to an OSS/BSS gateway 644. In a particular embodiment, the application server 642 can provide applications to the set-top box devices 616, 624 via the access network 666, which enable the set-top box devices 616, 624 to provide functions, such as display, messaging, processing of IPTV data and VOD material, etc. In a particular embodiment, the OSS/BSS gateway 644 includes operation systems and support (OSS) data, as well as billing systems and support (BSS) data. In one embodiment, the OSS/BSS gateway 644 can provide or restrict access to an OSS/BSS server 664 that stores operations and billing systems data.

The second APP switch 640 can be coupled to a domain controller 646 that provides Internet access, for example, to users at their computers 668 via the public network 612. For example, the domain controller 646 can provide remote Internet access to IPTV account information, e-mail, personalized Internet services, or other online services via the public network 612. In addition, the second APP switch 640 can be coupled to a subscriber and system store 648 that includes account information, such as account information that is associated with users who access the IPTV system 600 via the private network 610 or the public network 612. In an illustrative embodiment, the subscriber and system store 648 can store subscriber or customer data and create subscriber or customer profiles that are associated with IP addresses of corresponding set-top box devices 616, 624.

In a particular embodiment, the application tier 604 can include a client gateway 650 that communicates data directly to the client-facing tier 602. In this embodiment, the client gateway 650 can be coupled directly to the CFT switch 630. The client gateway 650 can provide user access to the private network 610 and the tiers coupled thereto. In an illustrative embodiment, the set-top box devices 616, 624 can access the IPTV system 600 via the access network 666, using information received from the client gateway 650. User devices can access the client gateway 650 via the access network 666, and the client gateway 650 can allow such devices to access the private network 610 once the devices are authenticated or verified. Similarly, the client gateway 650 can prevent unauthorized devices, such as hacker computers or stolen set-top box devices from accessing the private network 610, by denying access to these devices beyond the access network 666.

For example, when the first representative set-top box device 616 accesses the client-facing tier 602 via the access network 666, the client gateway 650 can verify subscriber information by communicating with the subscriber and system store 648 via the private network 610. Further, the client gateway 650 can verify billing information and status by communicating with the OSS/BSS gateway 644 via the private network 610. In one embodiment, the OSS/BSS gateway 644 can transmit a query via the public network 612 to the OSS/BSS server 664. After the client gateway 650 confirms subscriber and/or billing information, the client gateway 650 can allow the set-top box device 616 to access IPTV content and VOD content at the client-facing tier 602. If the client gateway 650 cannot verify subscriber information for the set-top box device 616, e.g., because it is connected to an unauthorized twisted pair, the client gateway 650 can block transmissions to and from the set-top box device 616 beyond the access network 666.

As indicated in FIG. 6, the acquisition tier 606 includes an acquisition tier (AQT) switch 652 that communicates with the private network 610. The AQT switch 652 can also communicate with the operations and management tier 608 via the public network 612. In a particular embodiment, the AQT switch 652 can be coupled to a live acquisition server 654 that receives or acquires television content, movie content, advertisement content, other video content, or any combination thereof, from a broadcast service 656, such as a satellite acquisition system or satellite head-end office. In a particular embodiment, the live acquisition server 654 can transmit content to the AQT switch 652, and the AQT switch 652 can transmit the content to the CFT switch 630 via the private network 610.

In an illustrative embodiment, content can be transmitted to the D-servers 632, where it can be encoded, formatted, stored, replicated, or otherwise manipulated and prepared for communication from the video server(s) 680 to the set-top box devices 616, 624. The CFT switch 630 can receive content from the video server(s) 680 and communicate the content to the CPE 614, 622 via the access network 666. The set-top box devices 616, 624 can receive the content via the CPE 614, 622, and can transmit the content to the television monitors 618, 626. In an illustrative embodiment, video or audio portions of the content can be streamed to the set-top box devices 616, 624.

Further, the AQT switch 652 can be coupled to a video-on-demand importer server 658 that receives and stores television or movie content received at the acquisition tier 606 and communicates the stored content to the VOD server 636 at the client-facing tier 602 via the private network 610. Additionally, at the acquisition tier 606, the video-on-demand (VOD) importer server 658 can receive content from one or more VOD sources outside the IPTV system 600, such as movie studios and programmers of non-live content. The VOD importer server 658 can transmit the VOD content to the AQT switch 652, and the AQT switch 652, in turn, can communicate the material to the CFT switch 630 via the private network 610. The VOD content can be stored at one or more servers, such as the VOD server 636.

When users issue requests for VOD content via the set-top box devices 616, 624, the requests can be transmitted over the access network 666 to the VOD server 636, via the CFT switch 630. Upon receiving such requests, the VOD server 636 can retrieve the requested VOD content and transmit the content to the set-top box devices 616, 624 across the access network 666, via the CFT switch 630. The set-top box devices 616, 624 can transmit the VOD content to the television monitors 618, 626. In an illustrative embodiment, video or audio portions of VOD content can be streamed to the set-top box devices 616, 624.

FIG. 6 further illustrates that the operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to an OSS/BSS server 664 and to a simple network management protocol (SNMP) monitor 686 that monitors network devices within or coupled to the IPTV system 600. In a particular embodiment, the OMT switch 660 can communicate with the AQT switch 652 via the public network 612.

Figure 7:
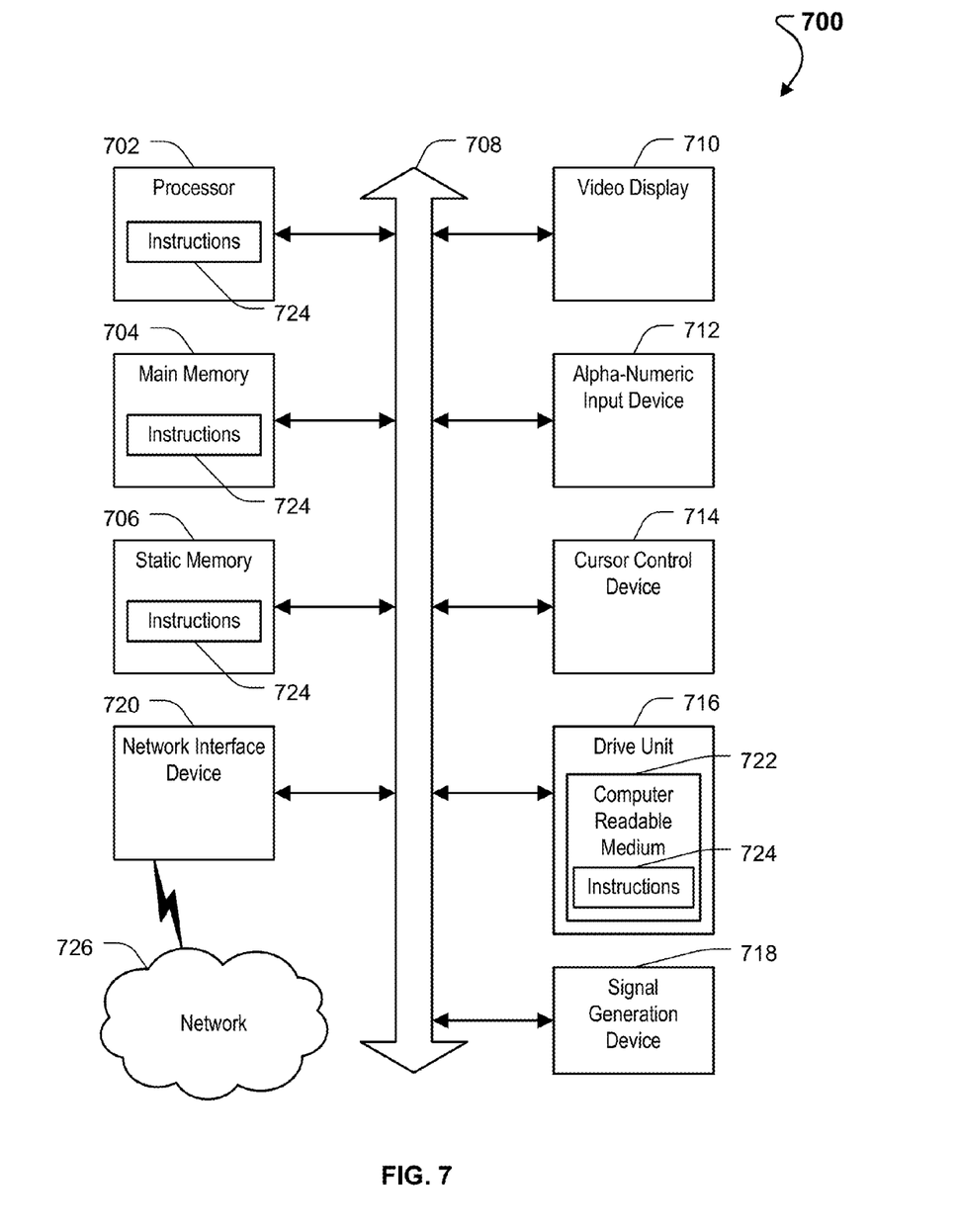
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system 700 may operate in the capacity of a set-top box device, a server, or a mobile computing device. For example, the computer system may include: the first CPE device 122, the second CPE device 124, the third device 126, or the fourth device 128 of FIG. 1; the communications device 230 or the communications gateway 202 of FIG. 2; the communications gateway 306 or the set-top box device 302 of FIG. 3; the communications gateway 410 or the set-top box device 402 of FIG. 4.

The computer system 700 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include or be coupled to a video display unit 710, such as a liquid crystal display (LCD), an organic light emitting diode (OLED), a flat panel display, a cathode ray tube (CRT) display, a solid-state display, or a projection display. For example, the video display unit 710 may include the display device 320 of FIG. 3 or the display device 422 of FIG. 4. Additionally, the computer system 700 may include an input device 712, such as a keyboard, a remote control device, and a cursor control device 714, such as a mouse. The computer system 700 can also include a disk drive unit 716, a signal generation device 718, such as a speaker or remote control device, and a network interface device 720. The network interface device 720 may be coupled to other devices (not shown) via a network 726.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g. TCP/IP, UDP/IP, HTML, and HTTP) and standards for viewing media content (e.g. MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a communications gateway associated with a customer premises, multimedia content from a communications network;
superimposing, via the communications gateway, a heartbeat signal on an alternating current electrical power signal associated with an electrical wiring system of the customer premises;
encoding the multimedia content based on the heartbeat signal to produce encoded multimedia content at the communications gateway; and
wirelessly transmitting the encoded multimedia content from the communications gateway to a device while providing the heartbeat signal via the electrical wiring system, wherein the heartbeat signal enables the encoded multimedia content to be decoded.

2. The method of claim 1, further comprising modifying the heartbeat signal at fixed time intervals.

3. The method of claim 1, further comprising modifying the heartbeat signal at variable time intervals.

4. The method of claim 1, wherein the device is coupled to the electrical wiring system and wherein the device uses the heartbeat signal extracted from the alternating current electrical power signal to decode the encoded multimedia content.

5. The method of claim 1, wherein the device is inhibited from decoding the encoded multimedia content due to absence of the heartbeat signal when the device is not coupled to the electrical wiring system.

6. The method of claim 1, wherein the device comprises a set-top box device.

7. The method of claim 1, wherein the heartbeat signal is based on a first prime number during a first time period.

8. The method of claim 7, wherein the heartbeat signal is based on a second prime number during a second time period.

9. The method of claim 1, wherein the communications network includes an internet protocol television network, a cable network, or a satellite television network.

10. A computer-readable storage device comprising instructions executable by a processor to perform operations including:
receiving multimedia content from a communications network;
superimposing a heartbeat signal on an alternating current electrical power signal associated with an electrical wiring system of a customer premises;
encoding the multimedia content based on the heartbeat signal to produce encoded multimedia content; and
wirelessly transmitting the encoded multimedia content to a device while providing the heartbeat signal via the wiring system, wherein the heartbeat signal enables the encoded multimedia content to be decoded.

11. The computer-readable storage device of claim 10, wherein the operations further include receiving a request for the multimedia content from the device prior to receiving the multimedia content from the communications network.

12. The computer-readable storage device of claim 10, wherein the heartbeat signal comprises a first heartbeat signal during a first time interval and a second heartbeat signal during a second time interval.

13. The computer-readable storage device of claim 12, wherein the first heartbeat signal is based on a first random number, and wherein the second heartbeat signal is based on a second random number different from the first random number.

14. The computer-readable storage device of claim 10, wherein the device is inhibited from decoding the encoded multimedia content due to absence of the heartbeat signal when the device is not coupled to the electrical wiring system.

15. The computer-readable storage device of claim 10, wherein the device is coupled to the electrical wiring system, and wherein the device uses the heartbeat signal extracted from the alternating current electrical power signal to decode the encoded multimedia content.

16. A media device comprising:
a processor; and
a memory coupled to the processor, the memory including instructions executable by the processor to perform operations comprising:
receiving encoded multimedia content wirelessly transmitted from a communications gateway;
receiving an alternating current signal via an electrical wiring system while receiving the encoded multimedia content, wherein the alternating current signal includes a heartbeat signal added by the communications gateway;
extracting the heartbeat signal from the alternating current signal; and
decoding the encoded multimedia content based on the heartbeat signal.

17. The media device of claim 16, wherein the communications gateway is associated with a customer premises and wherein the electrical wiring system is coupled to the customer premises.

18. The media device of claim 16, wherein the operations further comprise:
generating a message in response to a failure detected during decoding of the encoded multimedia content; and
sending the message to a display device coupled to the processor.

19. The media device of claim 16, wherein the operations include sending a message to a display device in response to detecting a failure to receive the heartbeat signal.

20. The media device of claim 16, wherein the operations further comprise sending multimedia content decoded from the encoded multimedia content to a display device.

* * * * *